Sept. 30, 1969  HAJIME TAMURA  3,469,305
METHOD FOR PREVENTING CRACKING OF MACHINE PARTS
Filed Aug. 6, 1964  2 Sheets-Sheet 1
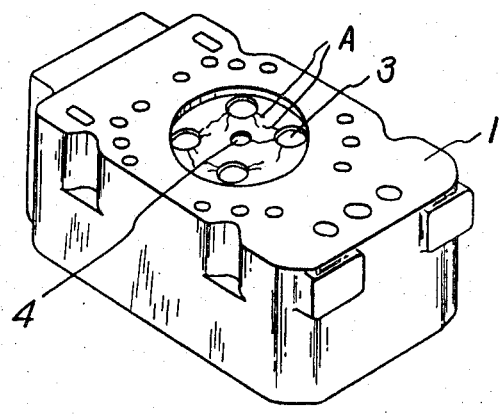
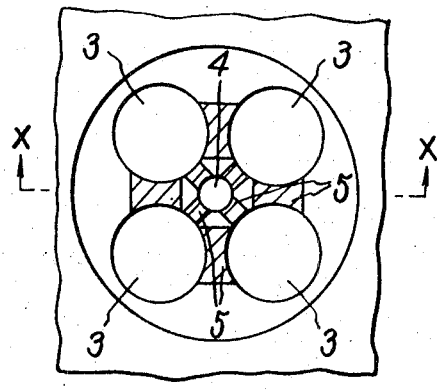
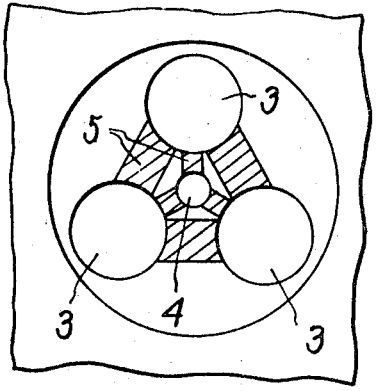

United States Patent Office 3,469,305
Patented Sept. 30, 1969

3,469,305
METHOD FOR PREVENTING CRACKING
OF MACHINE PARTS
Hajime Tamura, Kawasaki, Japan, assignor to Mitsubishi
Jukogyo Kabushiki Haisha, Tokyo, Japan
Filed Aug. 6, 1964, Ser. No. 387,926
Int. Cl. B23p 7/04, 17/00
U.S. Cl. 29—527.4                                3 Claims

ABSTRACT OF THE DISCLOSURE

A method for preventing the formation of cracks emanating from the valve openings and fuel injection openings in the cylinder head of a diesel engine due to thermal stresses includes the step of forming bevels in the region of the openings where the body is subject to the formation of the cracks. The bevels are then filled with a welded metal of higher ductility than the head.

---

This invention relates to a method for preventing cracking of machine parts.

Many mechanical parts are subjected to local concentrated stresses and tending to crack the parts and render them unfit for use. In such cases, it has been the practice to modify the design or change the operating conditions, or if neither is practicable, to make the parts from tougher materials. However, all of these steps involve difficulties in replacement, incur great expense, and make it necessary to abandon the old parts as defective and dangerous components.

The cylinder head of a diesel engine may be taken as an example. Many cylinder heads have been discarded simply because of cracks in the valve seats which develop while the engine is running. The countermeasures hitherto taken are, in most cases, to make the heads of tougher materials, or modify the design or change the operating conditions, and these affect the engine performance materially. This, consequently, adds to the manufacturing costs and entails greater difficulties in casting or other methods of forming the parts and in subsequent machining.

According to the present invention, the part is subjected to a treatment which resists the cracking tendency thereof. The treatment comprises forming bevels in the body in the region which is stressed and may develop cracks, and filling the bevels with a highly ductile material which is welded or brazed to the part.

Figure 4:
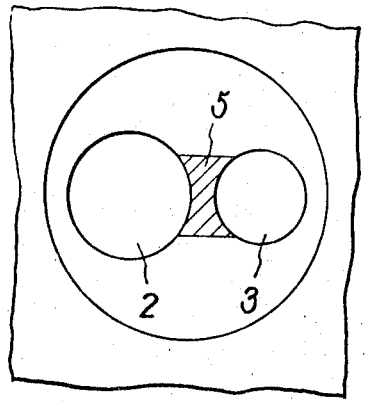
Figure 5:
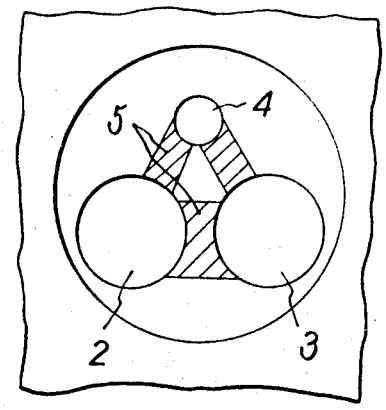
Figure 6:
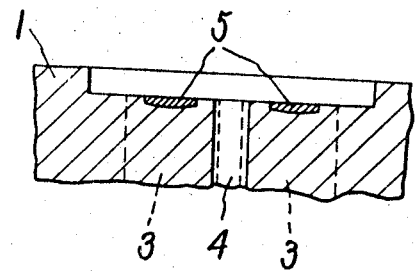

The invention is described in further detail with reference to the accompanying drawing, wherein:

FIG. 1 is a perspective view of a cylinder head of a diesel engine, which has become cracked by use;

FIGS. 2 through 5 are side views of cylinder heads similar to the one shown in FIG. 1 but incorporating the invention, FIGS. 2 and 3 showing cylinder heads for 4 cycle engines, and FIGS. 4 and 5 those for 2 cycle engines; and FIG. 6 is a partial sectional view taken along the line X—X of FIG. 2.

Referring to FIG. 1, the cylinder head 1 for a diesel engine as shown often develops cracks A between the suction and exhaust valve seats 2, 3 and between the valve seats and the central opening 4 for the fuel injection chamber, eventually rendering the cylinder head unfit for use. The cracks A are caused while the engine is running. Therefore, in this example, a tougher material was employed for the manufacture of the cylinder head, that is, the original part of ordinary cast iron was replaced by a part made of nickel-chromium alloy cast iron. The cracking nevertheless persisted, and it was impossible to use an even tougher material without drastically modifying the design, because any tougher material would tend to result in defective castings or invite increased difficulties in machining. In addition, modification of the cylinder head design is practically impossible because it is very likely to affect the engine performance adversely.

The method of the invention has been devised to circumvent all the foregoing difficulties. It is applied in practice in the following sequence of procedures:

(a) On the portions most susceptible to cracking, bevels 5 for welding are formed as shown in FIGS. 2 through 6.

(b) The base metal (cylinder head) is preheated at from 150° to 200° C., and the bevels 5 are welded and filled with a pure nickel core electrode.

(c) On completion of the welding, the part is kept at a temperature from 540 to 560° C. and then allowed to cool in the furnace, thereby to remove the residual stress due to welding and to effect annealing.

(d) After the annealing, the part is machined and finally used for the engine.

As shown in FIG. 6, most of the deposited metal remains after the machining and forms part of the cylinder head.

Thus, as will be understood from the foregoing description, the portion of a mechanical part which is subjected to concentrated stress, for example, the portion between the suction and exhaust valve seats of a cylinder head, is welded or brazed with a highly ductile or heat-resisting metal or alloy, so that the welded or brazed metal or alloy can resist the stress at said susceptible portion, and hence can prevent cracking of said portion.

An engine which incorporated the cylinder head improved by the invention has operated satisfactorily, and when the engine was overhauled and checked during several subsequent periodic inspections, the cylinder head showed no cracks whatsoever, abundantly attesting to the advantageous effect of the method of the invention. As hereinabove described, the present invention makes it possible to prevent local cracking of machine parts easily with limited manpower and with no need of replacing the parts by new ones of special materials, and hence with a minimum of cost.

What is claimed is:

1. A method for preventing the formation of cracks in the vicinity of a hole in a metal body due to thermal stresses produced in said body, said method comprising forming bevels in said body in the region of said hole where the body is subject to the formation of the cracks, filling said bevels with a welded heat resisting metal having a substantially higher ductility than said body.

2. A method as claimed in claim 1 wherein said body is provided with a second hole therein and the bevels are formed between the holes.

3. A method as claimed in claim 2 wherein said body is a cylinder head and said holes are for suction, exhaust or fuel injection, the bevels being formed in the head in seats surrounding the holes.

References Cited

UNITED STATES PATENTS

| 1,709,606 | 4/1929 | Catland | 29—527 X |
| 2,709,295 | 5/1955 | Chyle | 29—527 X |
| 3,295,198 | 1/1967 | Coan | 29—527 |
| 3,033,977 | 5/1962 | Quaos | 219—146 |
| 3,328,557 | 6/1967 | Rogers et al. | 219—146 |

OTHER REFERENCES

Welding Handbook, third edition, American Welding Society (New York), January 1950, pp. 586–591.

JOSEPH V. TRUHE, Primary Examiner
J. G. SMITH, Assistant Examiner

U.S. Cl. X.R.
29—402; 123—193; 219—85, 137